United States Patent
Utsumi et al.

(10) Patent No.: US 7,665,562 B2
(45) Date of Patent: Feb. 23, 2010

(54) DRIVE SHAFT CASE FOR MOTORCYCLE AND MOTORCYCLE

(75) Inventors: Yoichi Utsumi, Kobe (JP); Hisatoyo Arima, Himeji (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 126 days.

(21) Appl. No.: 11/707,764

(22) Filed: Feb. 16, 2007

(65) Prior Publication Data
US 2008/0006464 A1    Jan. 10, 2008

(30) Foreign Application Priority Data
Feb. 20, 2006    (JP) .............................. 2006-042874

(51) Int. Cl.
*B62M 17/00* (2006.01)
(52) U.S. Cl. .................................... 180/226
(58) Field of Classification Search ................ 180/226, 180/380; 74/609; 464/177, 176
See application file for complete search history.

(56) References Cited

U.S. PATENT DOCUMENTS

| | | | | |
|---|---|---|---|---|
| 2,443,035 A | * | 6/1948 | Hardy | 464/176 |
| 4,434,868 A | * | 3/1984 | Brenner et al. | 180/226 |
| 4,436,173 A | * | 3/1984 | Takahashi | 180/226 |
| 4,568,313 A | * | 2/1986 | Diffenderfer et al. | 464/172 |
| 4,664,215 A | * | 5/1987 | Suzuki et al. | 180/226 |
| 4,702,724 A | * | 10/1987 | Vater | 464/172 |
| 5,263,549 A | * | 11/1993 | Dick | 180/226 |
| 5,509,858 A | * | 4/1996 | Grosse-Entrup | 464/172 |
| 6,189,640 B1 | * | 2/2001 | Young et al. | 180/235 |
| 6,932,178 B2 | * | 8/2005 | Soatti | 180/226 |

FOREIGN PATENT DOCUMENTS

| | | | | |
|---|---|---|---|---|
| DE | 10232892 | | 1/2004 | |
| JP | 402144275 A | * | 6/1990 | 180/226 |
| JP | 09-109981 | | 4/1997 | |

* cited by examiner

*Primary Examiner*—Tony H. Winner
(74) *Attorney, Agent, or Firm*—Alleman Hall McCoy Russell & Tuttle LLP

(57) ABSTRACT

A tubular case into which a drive shaft configured to transmit a driving force from a transmission T of an engine to a rear wheel of a motorcycle is accommodated, the case including a case body which has an opening portion extending in an axial direction of the drive shaft and is configured to accommodate the drive shaft therein through the opening portion, and a cover removably attached to the case body so as to close the opening portion.

10 Claims, 9 Drawing Sheets

DRIVE SHAFT CASE FOR MOTORCYCLE AND MOTORCYCLE

TECHNICAL FIELD

The present invention relates to a case for accommodating a drive shaft mounted in a shaft drive type motorcycle, and a motorcycle comprising the case.

BACKGROUND ART

In motorcycles, a driving force is typically transmitted from a transmission of an engine to a rear wheel through a chain. In contrast, in shaft drive type motorcycles, the driving force is transmitted through a drive shaft extending in a longitudinal direction of a vehicle body instead of a chain (see e.g., Japanese Laid-Open Patent Application Publication No. Hei. 9-109981 or German Laid-Open Patent Application Publication No. 10232892). The shaft drive type motorcycles have the advantages that there is no need to adjust a stretch of the chain because of long-time use, or to frequently feed oil to the chain, and thus driving efficiency increases.

FIG. 9 is an enlarged view showing main parts of a drive shaft mounted in a conventional shaft drive type motorcycle. As shown in FIG. 9, a drive shaft 1 includes a first shaft member 2 having, at a front end thereof, a first bevel gear 2a which meshes with an output gear of a transmission of an engine. The first shaft member 2 is coupled to a second shaft member 4 via a first universal joint 3. The second shaft member 4 is coupled to a third shaft member 6 via a spline coupling portion 8 and a second universal joint 5. The spline coupling portion 8 has an engagement pin 10 at a spline on the second shaft member 4 side which is subjected to a radially outward force applied by a leaf spring 9 and is fitted into and engaged with an engagement hole 11 formed on a spline on the second universal joint 5 side. In a state where a second bevel gear 7 at a rear end of the third shaft member 6 is in mesh with a bevel gear mounted on a rear wheel not shown, the driving force is transmitted to the rear wheel.

The second shaft member 4 is inserted into a tubular drive shaft case 12 and is thus protected. A front end portion of the drive shaft case 12 is coupled to a transmission case 13 via a first rubber bellows-like tube 14, and a rear end portion thereof is coupled to a rear gear case 16 of the rear wheel via a second rubber bellows-like tube 15. The drive shaft case 12 has a small-diameter portion 12a with a diameter smaller than that of the universal joints 3 and 5. So, the second shaft member 4 is divided at the spline coupling portion 8 between the first universal joint 3 and the second universal joint 5 so that the second shaft member 4 is insertable into the drive shaft case 12 from forward.

However, since the drive shaft case 12 shown in FIG. 9 is a tubular unitary component, an operator needs to insert the drive shaft 1 into the drive shaft case 12 from an opening at one end of the drive shaft case 12, through an inside thereof, to an opening at an opposite end thereof. That is, the operator must move the drive shaft 1 over a large distance and therefore, operation is not easy. In addition, in order to insert the drive shaft 1 into the drive shaft case 12, it is necessary to provide the spline coupling portion 8 between the front universal joint 3 and the rear universal joint 5 to divide the drive shaft 1, increasing components of and assembly steps for the drive shaft 1. In order to couple the spline coupling portion 8 in an assembly process, it is necessary to make the second shaft member 4 and the second universal joint 5 to be coaxial with each other and to align the engagement pin 10 with the engagement hole 11. However, since the spline coupling portion 8 is covered with the case 12 and the bellows-like tube 15 and thus is invisible, the operator must remove the bellows-like tube 15 and see an inside of the bellows-like tube 15 to couple the universal joint 5 and the second shaft member 4. Therefore, the operation is not easy.

SUMMARY OF THE INVENTION

An object of the present invention is to reduce components of and assembly steps for a drive shaft mounted in a motorcycle and to make assembly operation easier.

According to a first aspect of the present invention, there is provided a drive shaft case for a motorcycle into which a drive shaft configured to transmit a driving force from a transmission of an engine to a rear wheel is accommodated, the drive shaft case having a tubular shape, comprising a case body which has an opening portion extending in an axial direction of the drive shaft and is configured to accommodate the drive shaft therein through the opening portion, and a cover removably attached to the case body so as to close the opening portion.

In such a construction, since the drive shaft case is divided into separate parts in the axial direction thereof, the operator accommodates the drive shaft into the case body through the opening portion from radially outward of the case, and closes the opening portion with the cover. Therefore, when inserting the drive shaft into the drive shaft case, it is not necessary to insert a large length of the drive shaft from an opening at one end of the tubular drive shaft case, through an inside thereof to an opening at an opposite end thereof. As a result, assembly operation becomes easier. As used herein, the transmission may be hand-operated or automatic, and may include transmissions such as a gear shifter, torque converter, or a belt converter.

The drive shaft may include an elongate shaft member disposed to extend in a forward and rearward direction of a vehicle body and universal joints which are disposed in front of and behind the elongate shaft member and have an outer diameter larger than an outer diameter of the elongate shaft member. The case body may include a small-diameter portion with an inner diameter smaller than the outer diameter of the universal joints and a large-diameter portion which extends from one end of the small-diameter portion and has an inner diameter larger than the outer diameter of the universal joints. A region of the opening portion corresponding to the small-diameter portion may extend over an entire length thereof in an axial direction of the case and have a width larger than the outer diameter of the elongate shaft member, and a region of the opening portion corresponding to the large-diameter portion may extend from the region of the opening portion corresponding to the small-diameter portion and allow one of the universal joints to be inserted thereinto.

In such a construction, the operator can insert the universal joint of the drive shaft into the case body through the region of the opening portion corresponding to the large-diameter portion from radially outward of the case. This makes it possible to insert the drive shaft into the drive shaft case without a need to provide a spline coupling portion between the front and rear universal joints of the drive shaft to divide the drive shaft, even in the case where the small-diameter portion of the drive shaft case has the inner diameter smaller than the outer diameter of the universal joints of the drive shaft. Therefore, components of and assembly steps for the drive shaft can be reduced. Furthermore, because of the absence of the spline coupling portion between the front and rear universal joints, the alignment step for the spline coupling can be omitted and thus operation becomes easier.

The large-diameter portion may be provided at one end portion of the case body. The region of the opening portion corresponding to the large-diameter portion of the case body may extend to a position inward of one end in the axial direction of the case.

In such a construction, since a tubular portion with an annular cross-section is formed at one end of the drive shaft case, an end portion of the cover can be pressed against the tubular portion for positioning the cover with respect to the case body when attaching the cover to the case body by providing the cover over the opening portion from above, making attachment operation of the cover easier. It should be noted that the opening portion may be formed to extend over the entire axial length of the case body.

The opening portion may extend to an opposite end in the axial direction of the case at an opposite end portion of the case body which is located on an opposite side of the large-diameter portion.

In such a construction, at the opposite end portion of the case body on the opposite side of the large-diameter portion, the drive shaft is inserted and accommodated into the case body through the opening portion from radially outward of the case. Therefore, the operation becomes easier.

The case body may further include a large-diameter portion which is formed at the opposite end portion thereof to extend from an opposite end of the small-diameter portion and has an inner diameter larger than the outer diameter of the universal joints.

In such a construction, when accommodating the drive shaft into the case body through the opening portion, the universal joint of the drive shaft can be inserted through the region of the opening portion corresponding to the second large-diameter portion. Therefore, the drive shaft can be accommodated into the drive shaft case more easily.

The case body may be made of metal and the cover may be made of resin.

In such a construction, the case body which is made of metal can have stiffness, and the cover which is made of resin becomes inexpensive and lightweight. The case body may be made of iron-based metal or aluminum-based metal.

According to another aspect of the present invention, there is provided a motorcycle comprising a drive shaft case for a motorcycle into which a drive shaft configured to transmit a driving force from a transmission of an engine to a rear wheel is accommodated, the drive shaft case having a tubular shape, the drive shaft case including a case body which has an opening portion extending in an axial direction of the drive shaft and is configured to accommodate the drive shaft therein through the opening portion, and a cover removably attached to the case body to close the opening portion.

According to the shaft drive type motorcycle having the above construction, components of and assembly steps for the motorcycle can be reduced, and assembly operation becomes easier.

DETAILED DESCRIPTION OF THE INVENTION

Hereinafter, embodiments of the present invention will be described with reference to the drawings. In the embodiment described below, the directions are referenced from the perspective of a rider (not shown) riding on a motorcycle.

Figure 1:
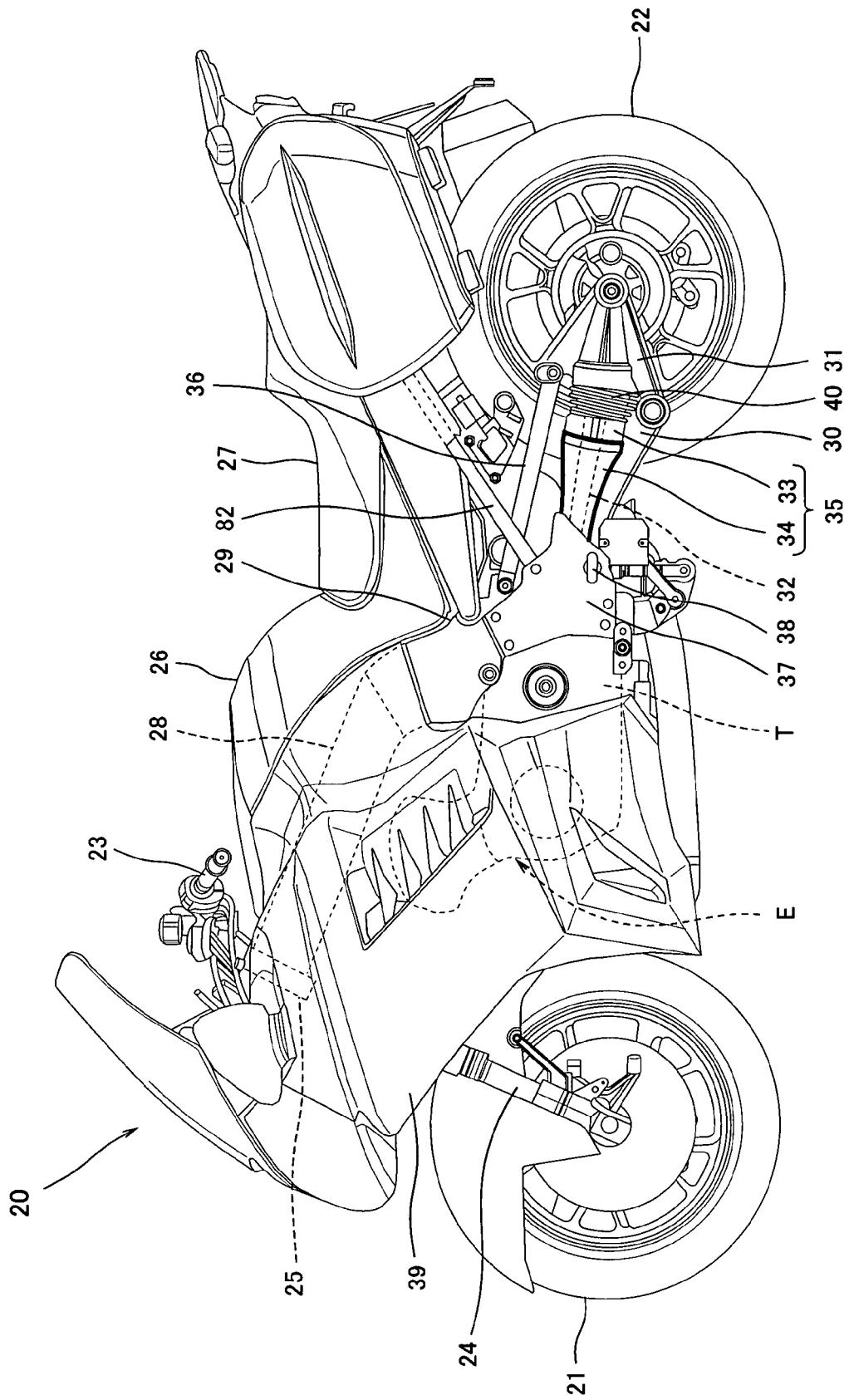
FIG. 1 is a side view of a motorcycle according to an embodiment of the present invention.

FIG. 1 is a side view of a motorcycle 20 according to an embodiment of the present invention. As shown in FIG. 1, the motorcycle 20 includes at least a front wheel 21 and a rear wheel 22. The front wheel 21 is rotatably mounted to a lower end portion of a front fork 24 extending substantially vertically. The front fork 24 is mounted on a steering shaft (not shown) by an upper bracket (not shown) attached to an upper end portion thereof, and an under bracket located below the upper bracket. The steering shaft is rotatably supported by a head pipe 25. A bar-type steering handle 23 extending in a rightward and leftward direction is attached to the upper bracket. When the rider rotates the steering handle 23 clockwise or counterclockwise, the front wheel 21 is turned to a desired direction around the steering shaft. A fuel tank 26 is disposed behind the steering handle 23. A seat 27 which is straddled by the operator is disposed behind the fuel tank 26.

Main frames 28 extend rearward from the head pipe 25 to be tilted slightly downward. Pivot frames 29 are coupled to rear regions of the main frames 28. An inline four-cylinder engine E is mounted on the main frames 28 and the pivot frames 29 between the front wheel 2 and the rear wheel 3. A cowling 39 is mounted to extend from a front portion of the vehicle body to side portions of the vehicle body so as to cover the engine E and the like.

Figure 2:
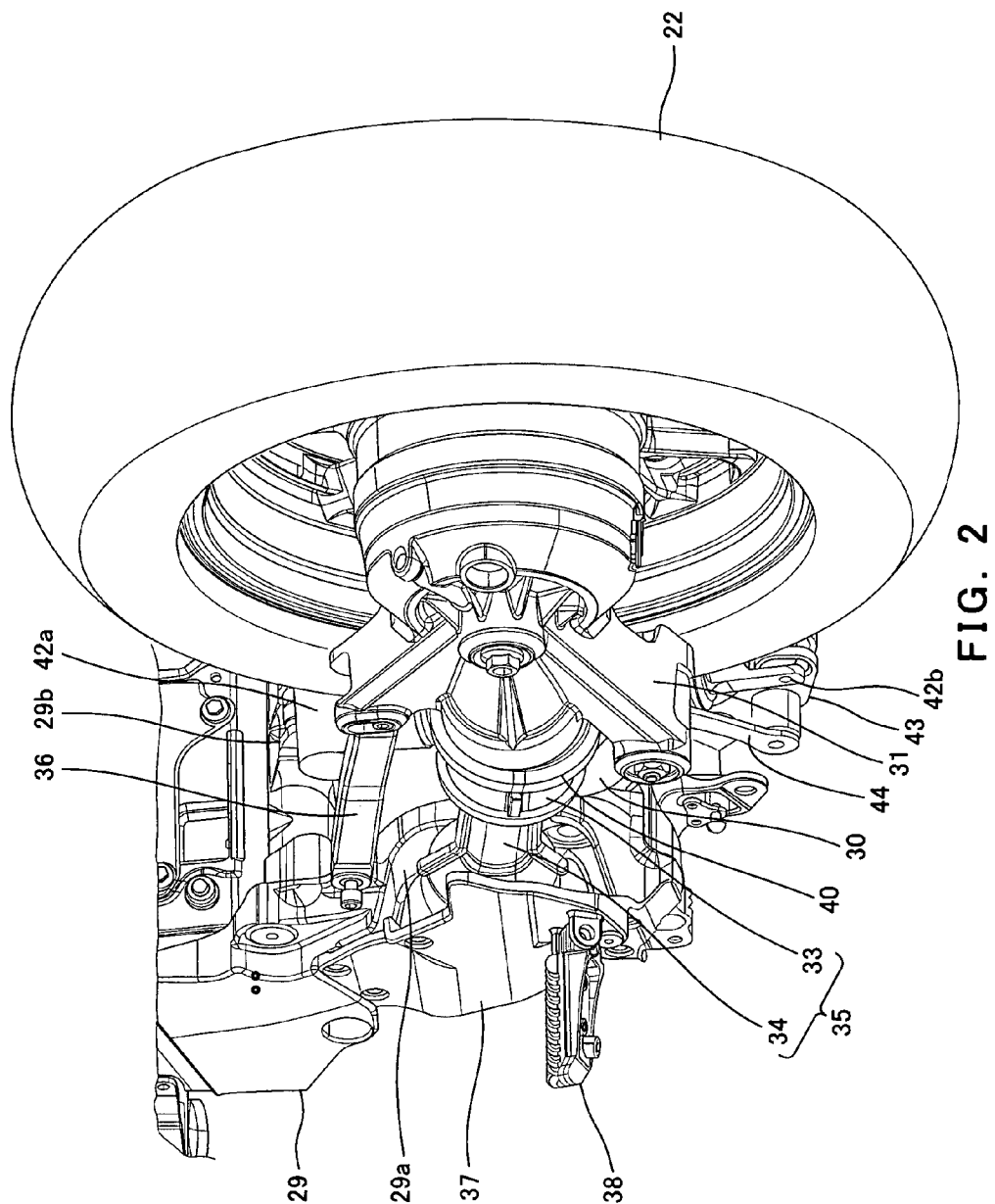
FIG. 2 is a perspective view of main components of the motorcycle shown in FIG. 1.

FIG. 2 is a perspective view of the motorcycle 20 shown in FIG. 1. As shown in FIG. 2, the pivot frame 29 is partially recessed toward a center in a width direction of a vehicle body to form a concave portion 29a. A drive shaft case 35 covering a drive shaft 32 described later is disposed in a space formed by closing the concave portion 29a with a frame cover 37. A step 38 is fixed to the frame cover 37 to allow the rider to put feet thereon and serves as a step bracket. As shown in FIG. 1, a rear frame 82 is coupled at one end portion thereof to a seat rail (not shown) for supporting the seat 27 and an opposite end portion thereof crosses an outward side of a torque rod 36 in the width direction of the vehicle body and is fastened to the frame cover 37.

Figure 3:
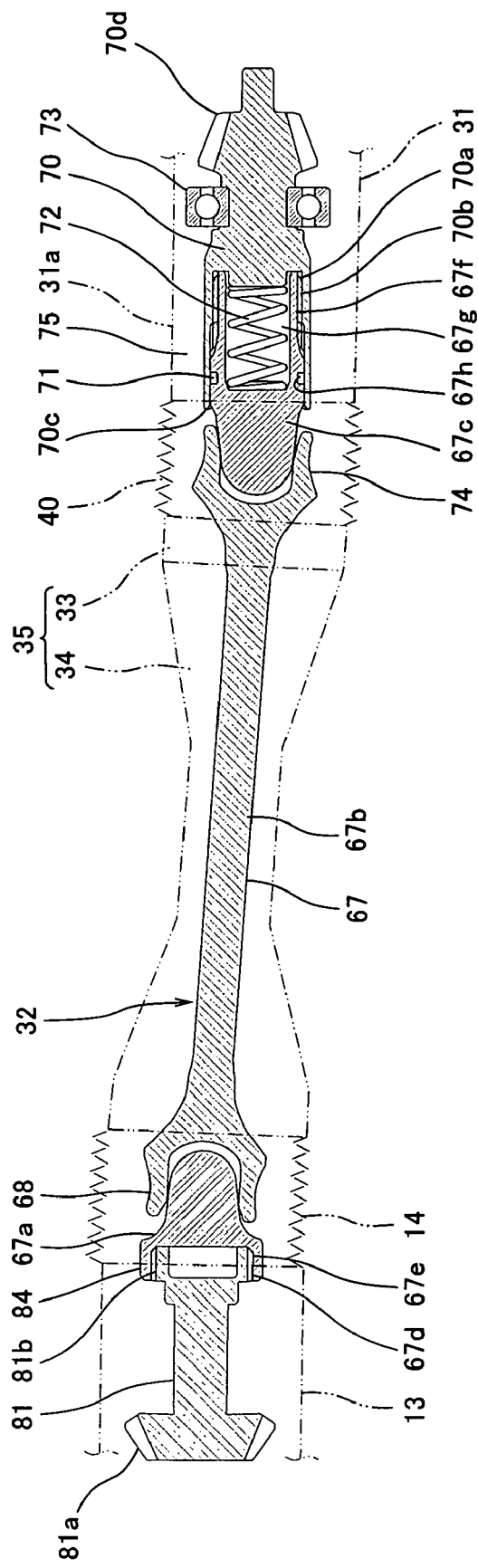
FIG. 3 is a cross-sectional view of a drive shaft of the motorcycle shown in FIG. 1.

FIG. 3 is a cross-sectional view of the drive shaft 32 of the motorcycle 20 shown in FIG. 1. As shown in FIG. 3, the drive shaft 32 includes a first shaft member 81 having a first bevel gear 81a which meshes with an output gear (not shown) of a transmission T (FIG. 1) of the engine E. A spline 81b is formed on an outer peripheral surface of a rear end portion of the first shaft member 81. A concave portion 67d is formed on a front end portion 67a of the second shaft member 67 which is coupled to a rear end portion of the first shaft member 81 and is configured to open in a front end surface thereof that is opposite to the first shaft member 81. An opposite spline 67e is formed on an inner peripheral surface of the concave portion 67d. That is, the spline 81b formed at the first shaft member 81 and the spline 67e formed at the front end portion 67a of the second shaft portion 67 are spline-coupled to form a spline coupling portion 84.

An elongate shaft portion 67b which is elongated in a forward and rearward direction is provided at a rear end of the front end portion 67a of the second shaft member 67 with a first universal joint 68 disposed between them. A rear end portion 67c is provided at a rear end of the elongate shaft portion 67b with a second universal joint 74 disposed between them. The second shaft member 67 is structured in such a manner that the elongate shaft portion 67b between the first and second universal joints 68 and 74 disposed on front and rear side thereof is formed of one rod member and thus is not divided. The first and second universal joints 68 and 74 have an outer diameter larger than that of the elongated shaft portion 67b.

The rear end portion 67c of the second shaft member 67 is coupled to a third shaft member 70 via the spline coupling portion 75. To be specific, a spline 67f is formed on an outer peripheral surface of a rear end side of the rear end portion 67c of the second shaft member 76, and a spring accommodating space 67g, which has a concave shape, opens in a rear end surface of the rear end portion 67c of the second shaft member 67. An annular groove 67h is formed on an outer peripheral surface of the rear end portion 67c of the second shaft member 67 so as to be located closer to a front end than the spline 67f, and is configured to accommodate a rubber annular oil seal member 71. A concave portion 70a is formed to open in a front end surface of the third shaft member 70 that is opposite to the second shaft member 67, and an opposite spline 70b is formed on an inner peripheral surface of the concave portion 70a. A taper portion 70c is formed on a front end surface of the concave portion 70a so as to have a diameter that is gradually increased toward the front end.

In a state where the spring 72 is disposed in the spring accommodating space 67g formed at the rear end portion 67c of the second shaft portion 67 and the annular oil seal member 71 is disposed in the annular groove 67h, the concave portion 70a of the third shaft member 70 is externally fitted to the rear end portion 67c of the second shaft member 67 from behind, and the spline 67f and the spline 70b are spline-coupled to each other, thus forming a spline coupling portion 75. Thus, the drive shaft 32 is extensible and contractable in such a manner that the second shaft member 67 and the third shaft member 70 slide and are displaced relative to each other at the spline coupling portion 75 in the forward and rearward direction which is their axial direction. A lubricating oil is applied to the spline 67f and the spline 70b which are slide surfaces, and the annular oil seal member 71 serves to inhibit leakage of the lubricating oil.

The third shaft member 70 is rotatably mounted to the rear gear case 31 attached to the rear wheel 31 by a ball bearing 73. A second bevel gear 70d is mounted on a rear end of the third shaft member 70 and is configured to mesh with a bevel gear (not shown) inside the rear gear case 31 to convert a driving force rotational direction to a wheel rotational direction so that the driving force is transmitted to the rear wheel 22 of FIG. 2 or 4.

Figure 4:
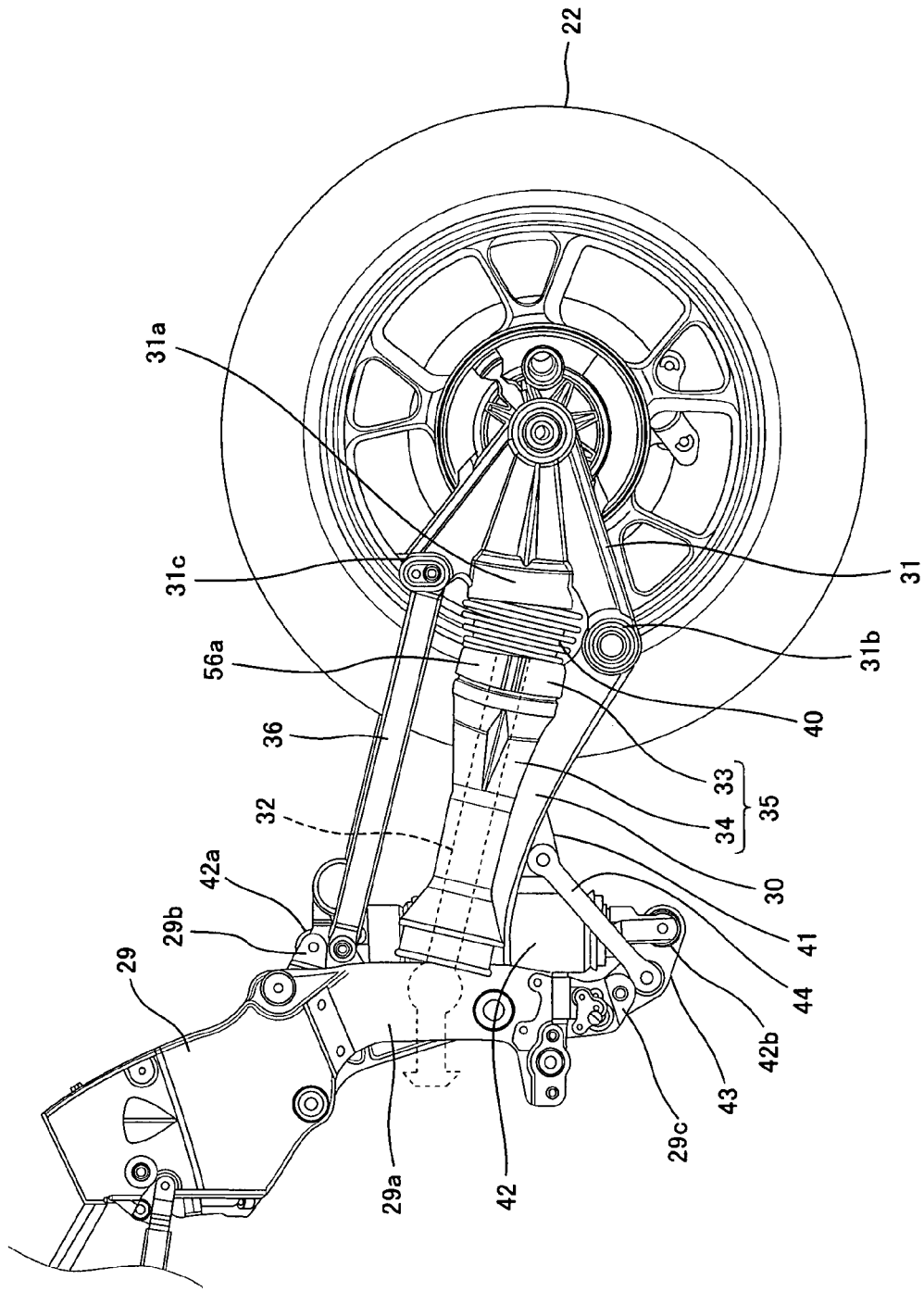
FIG. 4 is a side view of main components of the motorcycle shown in FIG. 1.

FIG. 4 is a side view of main components of the motorcycle 20 shown in FIG. 1, from which the frame cover 37 has been removed. As shown in FIG. 4, the rear gear case 31 mounted to the rear wheel 22 includes a cylindrical portion 31a into which a rear end of the drive shaft 32 is inserted, a lower bracket member 31b protruding forward and downward, and an upper bracket member 31c protruding forward and upward. A swing arm 30 of a substantially circular arc shape in a side view is pivotally mounted to the lower bracket member 31b and to the pivot frame 29. A torque rod 36 of a straight line shape in a side view is pivotally mounted to the upper bracket member 31c and to the pivot frame 29. In this embodiment, the torque rod 36 and the swing arm 30 arranged in an upper position and a lower position form a suspension unit coupling the pivot frame 29 to the rear wheel 22.

Figure 5:
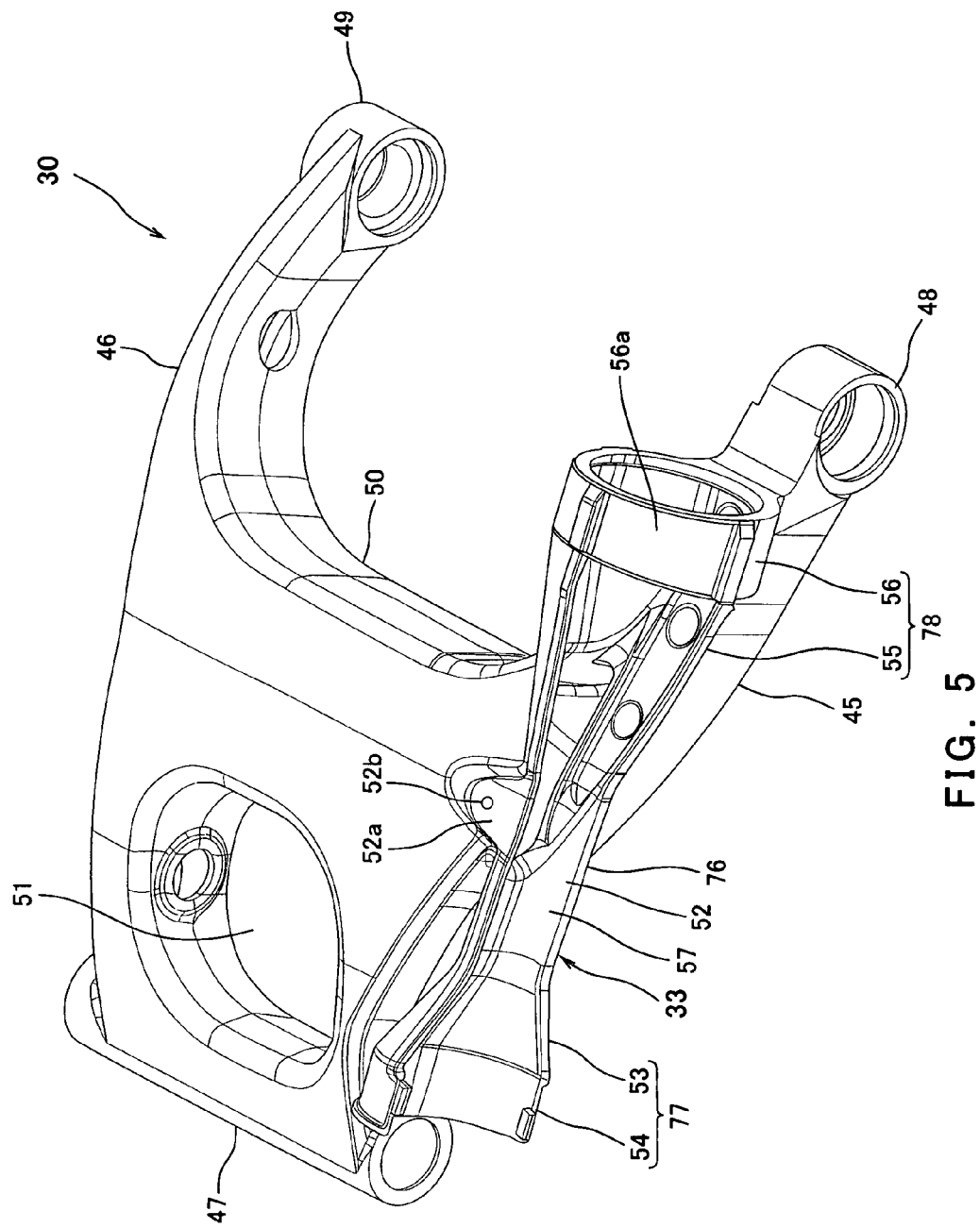
FIG. 5 is a perspective view of a swing arm to which a case body of a drive shaft case of the motorcycle shown in FIG. 1 is mounted.

FIG. 5 is a perspective view of the swing arm 30 of the motorcycle 20 of FIG. 1. As shown in FIG. 5, the swing arm 30 is made of metal such as steel or aluminum, and includes a left arm member 45 extending in a forward and rearward direction through a left side of the vehicle body, a right arm member 46 extending in the forward and rearward direction through a right side of the vehicle body, a front tubular member 47 which is connected to front end portions of the left arm member 45 and the right arm member 46 and has an axis extending in a rightward and leftward direction, and a coupling portion 50 extending in the rightward and leftward direction to couple an intermediate portion of the left arm member 45 in the forward and rearward direction and an intermediate portion of the right arm member 46 in the forward and rearward direction. A vertical penetrating hole 51 is formed between the front tubular member 47 and the coupling portion 50 to allow a shock absorber 42 (see FIG. 4) described later to be inserted thereinto. A bolt mounting member 48 is provided at a rear end portion of the left arm member 45 and is configured to be mounted pivotally to the lower bracket member 31b of the rear gear case 31 (see FIG. 4), and a bolt mounting member 49 is provided at a rear end portion of the right arm member 46 and is configured to be mounted pivotally to a bracket (not shown) mounted to a right side of the rear wheel 2 (see FIG. 4).

A case body 33, which forms the drive shaft case 35 (see FIG. 4 or the like), is integrally provided to the left arm member 45 of the swing arm 30. The case body 33 is made of metal, and has a shape in which the tubular drive shaft case 35 is divided in the axial direction (forward and rearward direction). The case body 33 has an opening portion 57 configured to open leftward of the vehicle body along the axial direction. The opening portion 57 extends from a front end of the case body 33 (see FIG. 4 and the like) to a position between the front end and a rear end thereof. A tubular end portion 56a (see FIG. 4 and the like) is formed at a rear end portion of the case body 33.

The case body 33 includes a first large-diameter portion 77, a small-diameter portion 52 which extends rearward from the first large-diameter portion 77 and has an inner diameter smaller than the outer diameter of the first and second universal joints 68 and 74 (FIG. 3), and a second large-diameter portion 78 extending rearward from the small-diameter portion 52. The first large-diameter portion 77 includes a first equal-diameter portion 54 which is coupled to the transmission case 13 (FIG. 3) via the first bellows-like tube 14 (FIG. 3) and has a diameter equal in the axial direction, and a reduced-diameter portion 53 which extends from a rear end of the first equal-diameter portion 54 to a front end of the small-diameter portion 52. The second large-diameter portion 78 has an increased-diameter portion 55 which extends from a rear end of the small-diameter portion 52 and a second equal-diameter portion 56 which extends from a rear end of the increased-diameter portion 55 and has a diameter equal in the axial direction. The opening portion 57 is formed to extend over the first equal-diameter portion 54, the reduced-diameter portion 53, the small-diameter portion 52, and the increased-diameter portion 55 and not in the second equal-diameter portion 56.

The opening portion 57 has, at the small-diameter portion 52, a smallest vertical opening width that is larger than the outer diameter of the elongate shaft portion 67b of the second shaft member 67 of the drive shaft 32 (FIG. 3).

The first equal-diameter portion 54 of the first large-diameter portion 77 has an inner diameter larger than the outer diameter of the first universal joint 68 (FIG. 3). The second equal-diameter portion 56 of the second large-diameter portion 78 has an inner diameter larger than the outer diameter of the second universal joint 74 (FIG. 3). A large-diameter portion of the reduced-diameter portion 53 of the first large-diameter portion 77 which is connected to the first equal-diameter portion 54 has an inner diameter larger than the outer diameter of the first universal joint 68 (FIG. 3). A large-diameter portion of the increased-diameter portion 55 of the second large-diameter portion 78 which is connected to the second equal-diameter portion 56 has an inner diameter larger than the outer diameter of the second universal joint 74 (FIG. 3). A small-diameter portion of the reduced-diameter portion 53 of the first large-diameter portion 77 which is connected to the small-diameter portion 52 has an inner diameter smaller than the outer diameter of the first universal joint 68 (FIG. 3). A small-diameter portion of the increased-diameter portion 55 of the second large-diameter portion 78 which is connected to the small-diameter portion 52 has an inner diameter smaller than the outer diameter of the second universal joint 74 (FIG. 3).

Furthermore, a flat bolting portion 52a provided with a bolt hole 52b is formed on an upper outer surface of the small-diameter portion 52. An engagement wall portion 76 is provided on a lower end of the opening portion 57 of the case body 33 so as to extend in the forward and rearward direction and to protrude downward.

Figure 6:
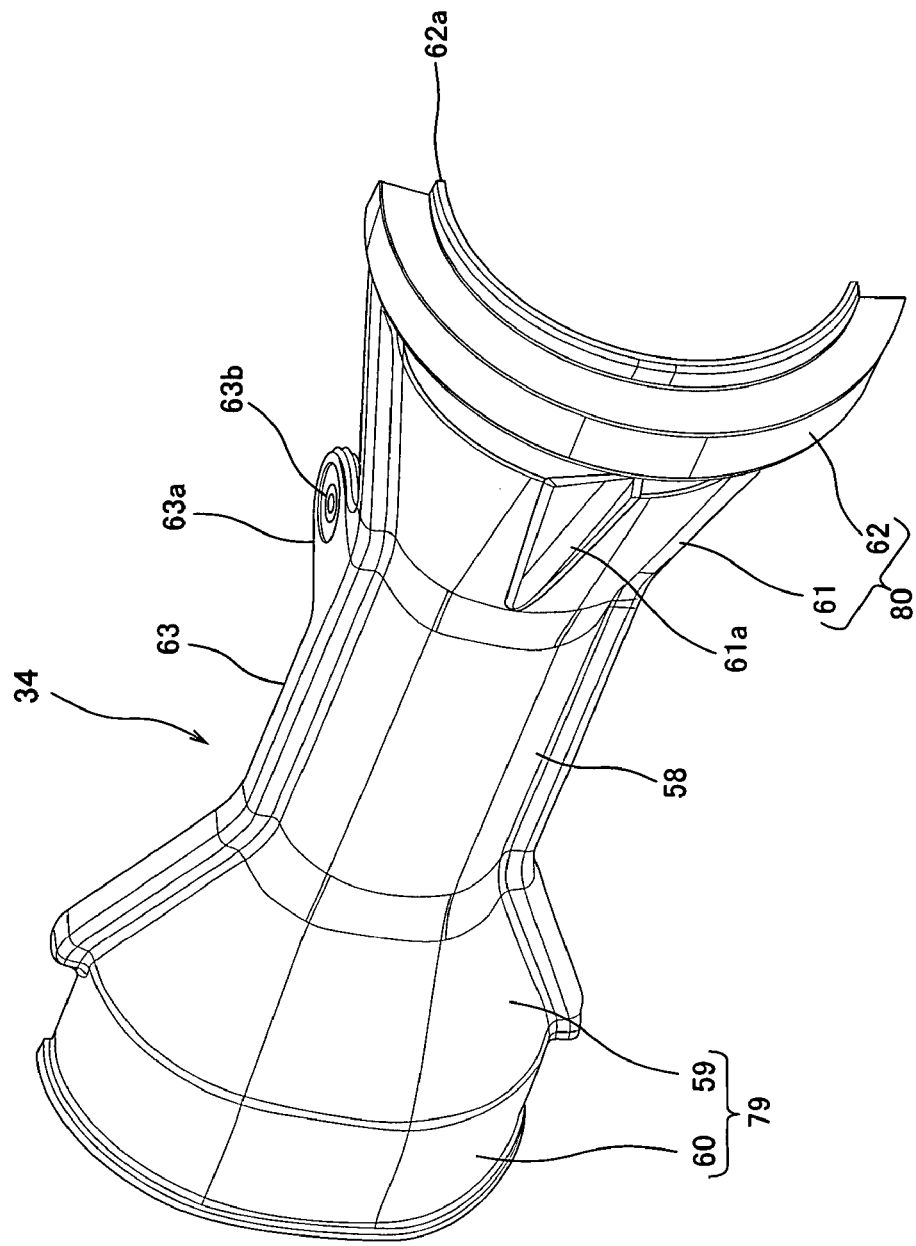
FIG. 6 is a perspective view of a cover of the drive shaft case of the motorcycle shown in FIG. 1, as viewed from its outer surface side.
Figure 7:
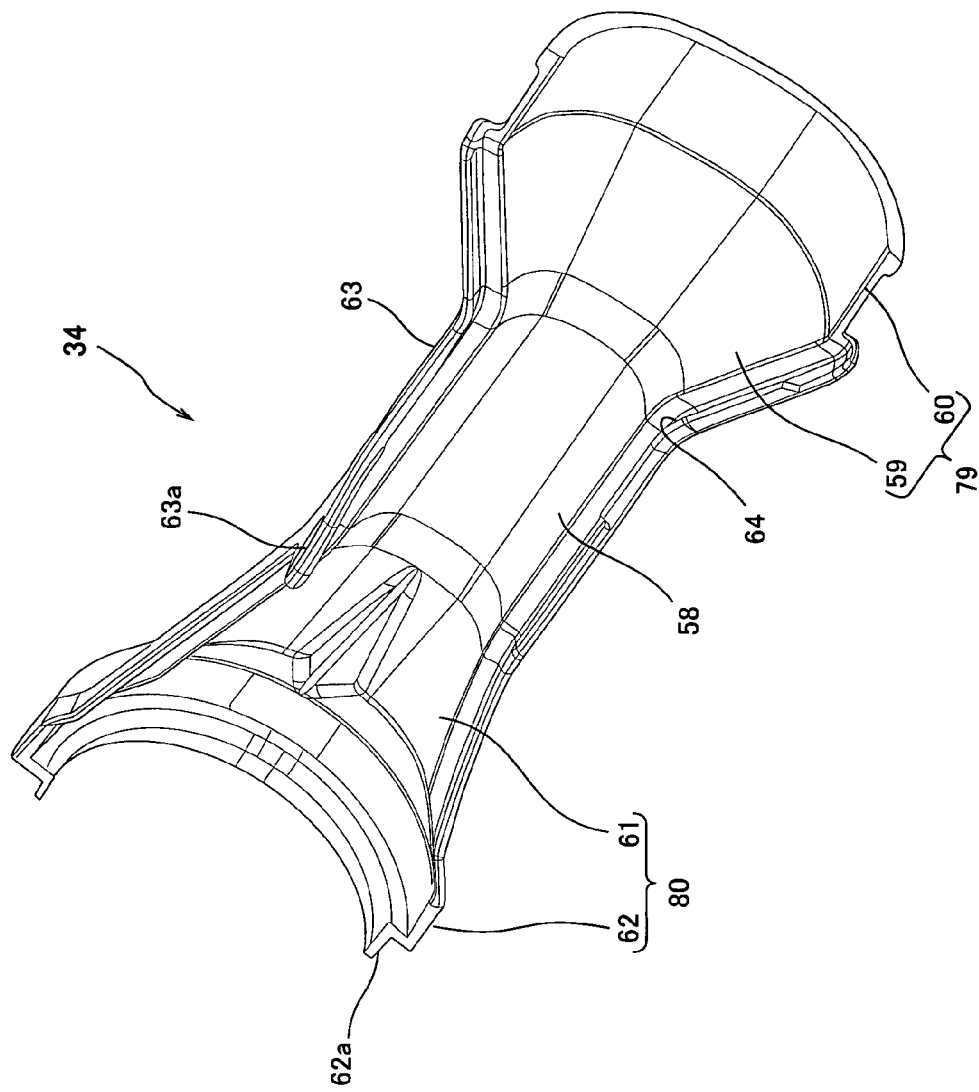
FIG. 7 is a perspective view of the cover of the drive shaft case of the motorcycle shown in FIG. 1, as viewed from its inner surface side.

FIG. 6 is a perspective view of the cover 34 of the drive shaft case 35 of the motorcycle 20 shown in FIG. 1 as viewed from an outer surface side. FIG. 7 is a perspective view of the cover 34 of the drive shaft case 35 of the motorcycle 20 shown in FIG. 1 as viewed from an inner surface side. As shown in FIGS. 6 and 7, the cover 34 is made of resin and has a substantially semi-circular cross-section so that the tubular drive shaft case 35 is formed by closing the opening portion 57 of the case body 33 (FIG. 5).

The cover 34 has a first large-diameter portion 79, a small-diameter portion 58 which extends rearward from the first large-diameter portion 79 and has an inner diameter smaller than that of the first large-diameter portion 79, and a second large-diameter portion 80 which extends rearward from the small-diameter portion 58 and has an inner diameter larger than that of the small-diameter portion 58. The first large-diameter portion 79 has a first equal-diameter portion 60 with an inner diameter equal in the axial direction and a reduced-diameter portion 59 which extends from a rear end of the first equal-diameter portion 60 to a front end of the small-diameter portion 58. The second large-diameter portion 80 has an increased-diameter portion 61 extending from a rear end of the small-diameter portion 58 and a second equal-diameter portion 62 which extends from a rear end of the increased-diameter portion 61 and has an inner diameter equal in the axial direction.

A protruding portion 63 protrudes from an upper end of the cover 34 in inverted-L-shape in cross section and is configured to cover an upper end of the opening portion 57 of the case body 33 (FIG. 5) from above. A bolt mounting portion 63a protrudes from a region of the protruding portion 63 corresponding to the small-diameter portion 58 and is configured to be superposed on the bolting portion 52a (FIG. 5) of the case body. The bolt mounting portion 63a is provided with a bolt hole 63b. An engagement flange 62a extends along a rear edge of the cover 34 and is fitted to and engaged with an edge of the case body 33 (FIG. 5) which faces the opening portion 57. A design rib 61a protrudes from an outer surface of the increased-diameter portion 61 to extend forward and rearward in the axial direction. As shown in FIG. 7, an engagement groove 64 is formed on a lower edge of the cover 34 to extend in the forward and rearward direction so that the engagement wall portion 76 of the case body 33 (FIG. 5) is fitted to and engaged with the engagement groove 64.

Figure 8:
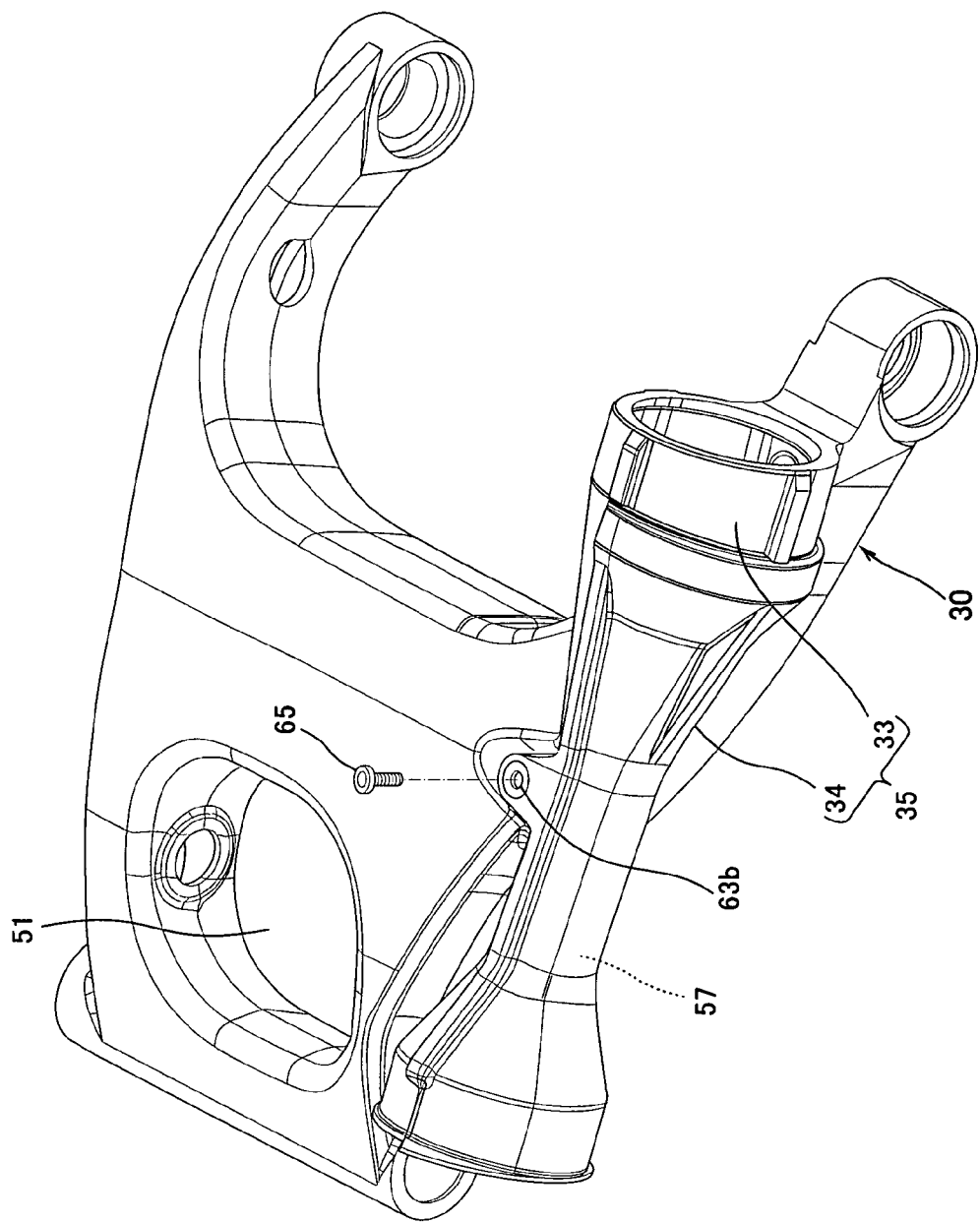
FIG. 8 is a perspective view of the drive shaft case with the cover attached to the case body of the motorcycle of FIG. 1.
Figure 9:
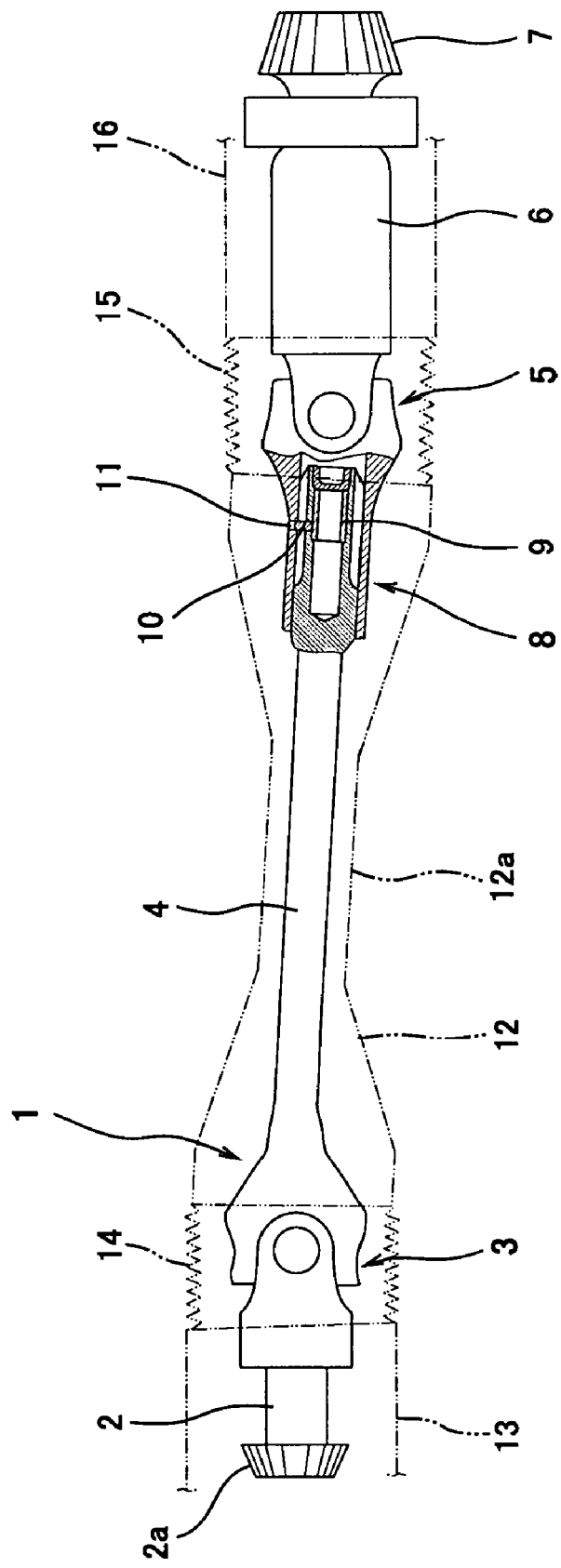
FIG. 9 is a view showing a conventional drive shaft.

FIG. 8 is a perspective view of the drive shaft case 35 with the cover 34 attached to the case body 33 of the motorcycle 20 shown in FIG. 1. As shown in FIG. 8, to form the tubular drive shaft case 35, the opening portion 57 of the case body 33 is closed by the cover 34 and these are fastened by a bolt 65 (specific assembly procedure will be described later).

As shown in FIG. 4, the drive shaft case 35 assembled as described above and the cylindrical portion 31a of the rear case 31 are coupled to each other by the second rubber bellows-like tube 40. As shown in FIG. 3, the second universal joint 74 of the drive shaft 32 is disposed inside the second bellows-like tube 40, and the spline coupling portion 75 is disposed inside the rear gear case 31 located in close proximity to the second bellows-like tube 40. The first universal joint 68 of the drive shaft 32 is disposed inside the first rubber bellows-like tube 14 coupling the drive shaft case 35 and the transmission case 13 to each other.

As shown in FIG. 4, the shock absorber 42 is coupled to the pivot frame 29 and to the swing arm 30 and is inserted into the penetrating hole 51 (FIG. 5) of the swing arm 30 to extend vertically. To be specific, an upper end portion 42a of the shock absorber 42 is mounted to a mounting member 29b of the pivot frame 29 that is located above the concave portion 29a, and a lower end portion 42b of the shock absorber 42 is mounted to a bell crank 43 mounted to a lower end portion 29c of the pivot frame 29. A mounting member 41 protruding downward from a lower surface of the swing arm 30 and the bell crank 43 are coupled to each other by a rod 44 so that the shock absorber 42 absorbs a load of vertical movement of the swing arm 30 with respect to the pivot frame 29.

Subsequently, a procedure for assembling the drive shaft case 35 into the motorcycle 20 will be described with reference to FIG. 3 and the like. Before assembly, the drive shaft 32 is separated into the first shaft member 81, the second shaft member 67, and the third shaft member 70 with the spline coupling portions 74 and 85 removed therefrom. The first shaft member 81 is ready to receive the second shaft member 67, in a state where the first bevel gear 81a is in mesh with the output gear (not shown) inside the transmission case 13, and the spline 81b thereof is exposed.

The second shaft member 67 is inserted into the case body 33 before assembly shown in FIG. 5 through the opening portion 57. In this case, the second shaft member 67 is inserted into and disposed in the case body 33 in such a manner that the second universal joint 74 (FIG. 3) is inserted into the tubular end portion 56a located at the rear end through a region of the opening portion 57 corresponding to the increased-diameter portion 55 (FIG. 5), and the elongate shaft portion 67b (see FIG. 3) is inserted into the case body 33 through the opening portion 57 from radially outward of the case.

The third shaft member 70 exposes the spline 70b in a state where the second bevel gear 70d is in mesh with the bevel gear (not shown) inside the cylindrical portion 31a of the gear case 31 (FIG. 4) before assembly.

Under this condition, the operator inserts the second shaft member 67 into the first bellows-like tube 14, and spline-couples the spline 67e of the front end portion 67a thereof to the spline 81b of the first shaft member 81 in the transmission case 13 which is ready to receive the second shaft member 67. Then, the operator couples the front tubular member 47 (FIG. 5) of the swing arm 30 to the pivot frame 29 (FIG. 4).

Then, the operator mounts the bolt mounting member 48 (FIG. 5) of the swing arm 30 to the lower bracket member 31b of the gear case 31 (FIG. 4) and inserts the rear end portion 67c of the second shaft member 67 (FIG. 3) into the second bellows-like tube 40 (FIG. 3) to spline-couple the spline 67f of the rear end portion 67c of the second shaft member 67 (FIG. 3) to the spline 70b of the third shaft member 70 in the rear gear case 31, which is ready to receive the second shaft member 67. In this case, since the cover 34 is not attached to the case body 33 (FIG. 4) and therefore, the operator can see inside through the opening portion 57 (FIG. 5), the operator can carry out spine coupling while seeing the associated components. In addition, since the taper portion 70c is provided on the front end surface of the third shaft member 70 (FIG. 3), the rear end portion 67c of the second shaft member 67 is smoothly fitted to the third shaft member 70.

Then, as shown in FIG. 4, the tubular end portion 56a of the case body 33 is coupled to the cylindrical portion 31a of the rear gear case 31 by the first bellows-like tube 40. In addition, the torque rod 36 is coupled to the upper bracket member 31c of the rear gear case 31 and to the pivot frame 29.

Then, as shown in FIG. 8, the opening portion 57 of the case body 33 is closed with the cover 34, thus completing the tubular drive shaft case 35. At this time, the cover 34 is attached in such a manner that the engagement groove 64 (FIG. 7) on the lower end side of the cover 34 is fitted to and engaged with the engagement wall member 76 (FIG. 5) of the case body 33 from downward, and the engagement flange 62a (FIG. 6) formed at the rear end side of the cover 34 is fitted to and engaged with an end portion of the opposite tubular end portion 56a which faces the opening portion 57. Then, the protruding portion 63 of the cover 34 is provided over the upper end of the opening portion 57 of the case body 33 from above, and the bolt mounting portion 63a (FIG. 6) is superposed on the bolt mounting portion 52a of the case body 33 (FIG. 5). And, the bolt 65 (FIG. 8) is inserted and fastened into the bolt hole 52b of the case body 33 (FIG. 5) and the bolt hole 63b of the cover 34, completing the drive shaft case 35. Then, the drive shaft case 35 and the transmission case 13 (FIG. 3 and the like) are coupled to each other by the first bellows-like tube 14.

In the above construction, the drive shaft case 35 is divided into right and left parts in the axial direction. Since the operator has only to accommodate the drive shaft 32 into the case body 33 (FIG. 4) through the opening portion 57 (FIG. 5) from radially outward and close the opening portion 57 with the cover 34 (FIG. 4), assembly operation becomes easier. In addition, the operator can insert the second universal joint 74 of the drive shaft 32 (FIG. 3) into the case body 33 through the region of the opening portion 57 corresponding to the increased-diameter portion 55 from radially outward of the case and the elongate shaft portion 67b of the drive shaft 32 into the case body 33 through the opening portion 57 from radially outward. This makes it possible to insert the second shaft member 67b (FIG. 3) into the drive shaft case 35 without a need to provide a spline coupling portion between the first universal joint 68 and the second universal joint 74 of the second shaft member 67b to divide the drive shaft 32, even though the small-diameter portion 52 (FIG. 5) of the drive shaft case 35 has a diameter smaller than those of the first and second universal joints 68 and 74 of the second shaft member 67b of the drive shaft 32. Therefore, components of and assembly steps for the drive shaft 32 can be reduced. Furthermore, because of the absence of the spline coupling portion between the first universal joint 68 and the second universal joint 74, alignment step for the spline coupling can be omitted and thus operation becomes easier.

Since the case body 33 is constructed such that the opening portion 57 does not extend over the entire axial length thereof but the tubular end portion 56 with circular cross-section is formed at the rear end portion thereof, the second bellows-like tube 40 can be mounted stably to an inner peripheral surface side of the tubular end portion 56a. In addition, when the cover 34 is attached to the case body 33 by providing the cover 34 over the opening portion 57 from above, positioning of the cover 34 with respect to the case body 33 is facilitated by pressing the engagement flange 62a at the edge of the cover 34 against the tubular end portion 56a. Thus, attachment operation of the cover 34 becomes easier. Furthermore, since the case body 33 is formed of metal integrally with the swing arm 30, components become fewer and stiffness can be increased. Moreover, the cover 34, which is made of resin, becomes inexpensive and lightweight.

Whereas the opening portion 57 is formed not to extend over the entire axial length of the case body 33 in this embodiment, it may alternatively be formed to extend over the entire axial length thereof without the tubular end portion 56a. The cover 34 may be made of metal instead of resin as illustrated in this embodiment. The case body 33 and the swing arm 30 may be separate instead of being integral in this embodiment. Moreover, the motorcycle of the present invention is not intended to be limited to the above motorcycle illustrated in the embodiment, but its structure may be altered, added or deleted within a scope of the invention.

What is claimed is:

1. A drive shaft case for a motorcycle into which a drive shaft configured to transmit a driving force from a transmission of an engine to a rear wheel is accommodated, the drive shaft case having a tubular shape, comprising:
    a case body which has an opening portion extending in an axial direction of the drive shaft and is configured to accommodate the drive shaft therein through the opening portion; and
    a cover removably attached to the case body so as to close the opening portion;
    wherein the opening portion extends from a front end of the case body to a position between the front end and a rear end thereof in the axial direction, and a tubular end portion is provided at a rear end portion of the case body.

2. A drive shaft case for a motorcycle into which a drive shaft configured to transmit a driving force from a transmission of an engine to a rear wheel is accommodated, the drive shaft case having a tubular shape, comprising:
    a case body which has an opening portion extending in an axial direction of the drive shaft and is configured to accommodate the drive shaft therein through the opening portion; and
    a cover removably attached to the case body so as to close the opening portion;
    wherein the drive shaft includes an elongate shaft member disposed to extend in a forward and rearward direction of a vehicle body and universal joints which are disposed in front of and behind the elongate shaft member and have an outer diameter larger than an outer diameter of the elongate shaft member;
    wherein the case body includes a small-diameter portion with an inner diameter smaller than the outer diameter of the universal joints and a large-diameter portion which extends from one end of the small-diameter portion and has an inner diameter larger than an outer diameter of the universal joints; and wherein a region of the opening portion corresponding to the small-diameter portion extends over an entire length thereof in an axial direction of the case and has a width larger than the outer diameter of the elongate shaft member, and a region of the opening portion corresponding to the large-diameter portion extends from the region of the opening portion corresponding to the small-diameter portion and allows one of the universal joints to be inserted thereinto.

3. The drive shaft case for a motorcycle according to claim 2, wherein the large-diameter portion is provided at one end portion of the case body; and wherein the region of the opening portion corresponding to the large-diameter portion of the case body extends to a position inward of one end in the axial direction of the case.

4. The drive shaft case for a motorcycle according to claim 3, wherein the opening portion extends to an opposite end in the axial direction of the case at an opposite end portion of the case body which is located on an opposite side of the large-diameter portion.

5. The drive shaft case for a motorcycle according to claim 4, wherein the case body further includes a large-diameter portion which is formed at the opposite end portion thereof to extend from an opposite end of the small-diameter portion and has an inner diameter larger than the outer diameter of the universal joints.

6. The drive shaft case for a motorcycle according to claim 1, wherein the case body is made of metal and the cover is made of resin.

7. A motorcycle comprising:

a drive shaft case for a motorcycle into which a drive shaft configured to transmit a driving force from a transmission of an engine to a rear wheel is accommodated, the drive shaft case having a tubular shape, the drive shaft case including:

a case body which has an opening portion extending in an axial direction of the drive shaft, the opening portion being configured to open in a radial direction of the drive shaft case and configured to accommodate the drive shaft therein through the opening portion; and a cover removably attached to the case body to close the opening portion;

wherein the drive shaft is separable into a plurality of shaft members; and wherein the case body has a space into which one of the plurality of shaft members is inserted through the opening portion of the case body in the radial direction from radially outward of the drive shaft case to a position at which the one of the plurality of shaft members is connected to another shaft member of the plurality of shaft members;

wherein the drive shaft includes universal joints in front of and behind an elongated shaft member disposed to extend in a forward and rearward direction of a vehicle body and the universal joints have a diameter larger than a diameter of the elongated shaft member;

wherein the case body includes a small-diameter portion with an inner diameter smaller than an outer diameter of the universal joints and a large-diameter portion which extends from one end of the small-diameter portion and has an inner diameter larger than the outer diameter of the universal joints; and wherein a region of the opening portion corresponding to the small-diameter portion extends over an entire length thereof in the axial direction of the case and has a width larger than an outer diameter of the elongate shaft member, and a region of the opening portion corresponding to the large-diameter portion extends from the region of the opening portion corresponding to the small-diameter portion and allows one of the universal joints to be inserted thereinto.

8. A motorcycle comprising:

a drive shaft case for a motorcycle into which a drive shaft configured to transmit a driving force from a transmission of an engine to a rear wheel is accommodated, the drive shaft case having a tubular shape, the drive shaft case including:

a case body which has an opening portion extending in an axial direction of the drive shaft, the opening portion being configured to open in a radial direction of the drive shaft case and configured to accommodate the drive shaft therein through the opening portion; and a cover removably attached to the case body to close the opening portion;

wherein the drive shaft is separable into a plurality of shaft members; and wherein the case body has a space into which one of the plurality of shaft members is inserted through the opening portion of the case body in the radial direction from radially outward of the drive shaft case to a position at which the one of the plurality of shaft members is connected to another shaft member of the plurality of shaft members; and wherein the plurality of shaft members are slidable relative to each other in the forward and rearward direction.

9. A motorcycle comprising:

a drive shaft case for a motorcycle into which a drive shaft configured to transmit a driving force from a transmission of an engine to a rear wheel is accommodated, the drive shaft case having a tubular shape, the drive shaft case including:

a case body which has an opening portion extending in an axial direction of the drive shaft, the opening portion being configured to open in a radial direction of the drive shaft case and configured to accommodate the drive shaft therein through the opening portion; and a cover removably attached to the case body to close the opening portion;

wherein the drive shaft is separable into a plurality of shaft members; and wherein the case body has a space into which one of the plurality of shaft members is inserted through the opening portion of the case body in the radial direction from radially outward of the drive shaft case to a position at which the one of the plurality of shaft members is connected to another shaft member of the plurality of shaft members;

wherein the drive shaft has a first shaft member, a second shaft member, and a third shaft member, and both end portions of the second shaft member are respectively spline-coupled to the first shaft member and the third shaft member such that the second shaft member is removably attached to the first shaft member and the third shaft member;

wherein the second shaft member is provided with a spline on an outer peripheral surface of an end portion thereof which is opposite to the third shaft member, and a concave-shaped spring accommodating space which opens in an end surface of the end portion; and wherein the third shaft member is provided with a concave portion which opens in an end surface opposite to the second shaft member, and a spline is provided on an inner peripheral surface of the concave portion; and wherein a spring is disposed in the spring accommodating space, and the concave portion of the third shaft member is externally fitted to the end portion of the second shaft member to cause the second shaft member and the third shaft member to be spline-coupled.

10. The motorcycle according to claim 9, wherein a taper portion is provided on an end surface of the concave portion of the third shaft member so as to have a diameter that is gradually increased toward an open end of the concave portion.

* * * * *

UNITED STATES PATENT AND TRADEMARK OFFICE
CERTIFICATE OF CORRECTION

PATENT NO. : 7,665,562 B2
APPLICATION NO. : 11/707764
DATED : February 23, 2010
INVENTOR(S) : Utsumi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 133 days.

Signed and Sealed this

Seventh Day of December, 2010

David J. Kappos
*Director of the United States Patent and Trademark Office*